Feb. 5, 1929.
T. DE C. TIFFT
1,701,198
HOT OIL PUMP
Filed June 7, 1927
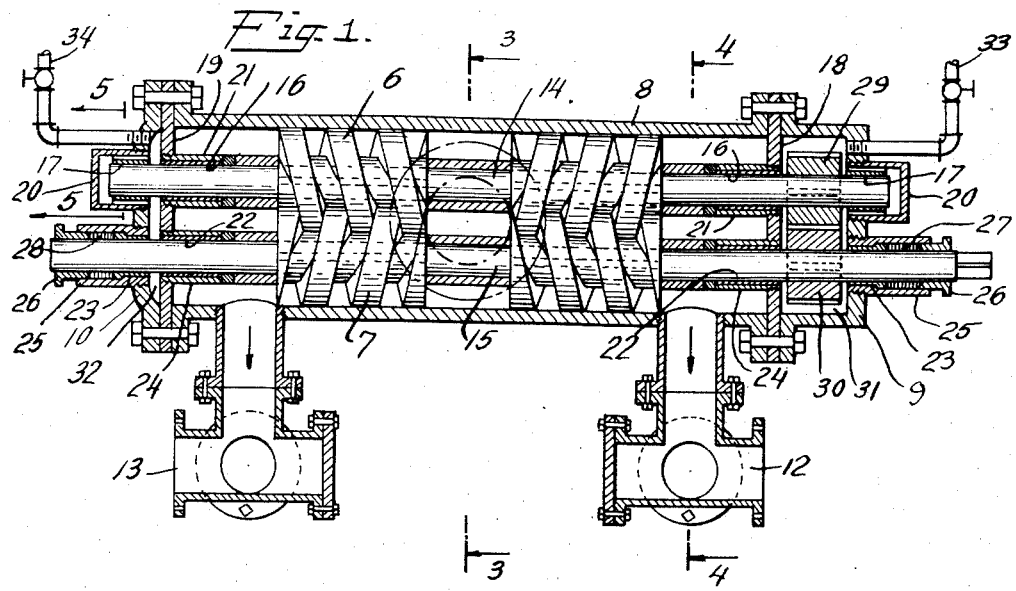
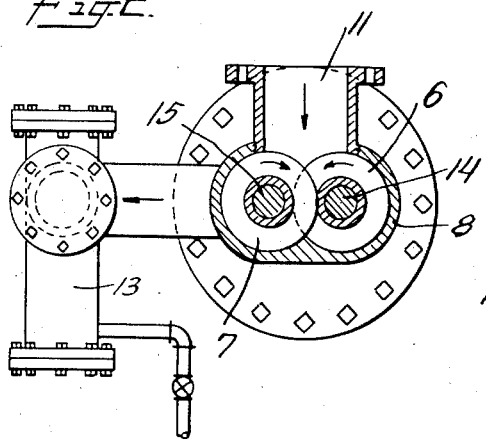
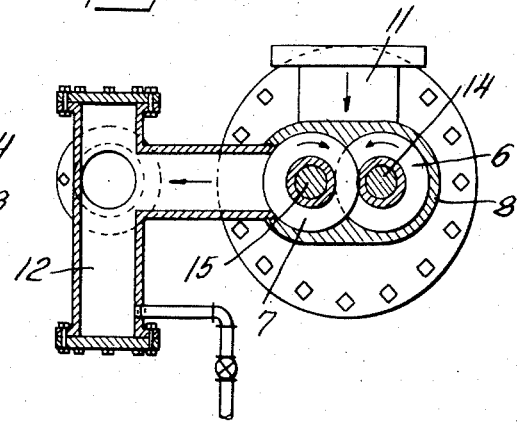
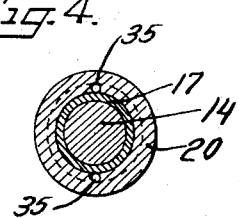
INVENTOR
Thomas d'C. Tifft
BY
Hector, Hibber, Davis & Macauley
ATTORNEYS Patented Feb. 5, 1929.

1,701,198

UNITED STATES PATENT OFFICE.

THOMAS DE COLON TIFFT, OF CHICAGO, ILLINOIS, ASSIGNOR TO SINCLAIR REFINING COMPANY, OF NEW YORK, N. Y., A CORPORATION OF MAINE.

HOT-OIL PUMP.

Application filed June 7, 1927. Serial No. 197,209.

This invention relates to improvements in pumps intended for handling hydrocarbon oils at or near a cracking temperature and under high pressure. In such service, pumps are subjected to peculiarly severe operating conditions yet must be dependable in operation and safe in operation. This invention provides an improved pump which meets the requirements of such operating conditions, which is dependable in operation, and which has several important advantages from the standpoint of safety. The improved pump of the invention is of positive displacement type and the construction is such that single units of large capacity, and retaining the advantages of the invention, can be built.

A pump embodying the invention is illustrated in the accompanying drawings, and the invention will be described in connection therewith. In the drawings: Fig. 1 represents a horizontal section through the improved pump of the invention, Fig. 2 is a section on line 3—3 of Fig. 1, Fig. 3 is a section on line 4—4 of Fig. 1, and Fig. 4 is a section on line 5—5 of Fig. 1.

Referring to Figs. 1 to 4 of the accompanying drawings, the pump comprises a pair of driven members 6 and 7 arranged within the housing made up of a housing member 8 and end covers 9 and 10. Each end of each driven member is in the form of a helical screw thread adapted to intermesh with and closely fit the screw thread on the adjacent end of the other driven member, the screw threads on opposite helixes. The housing member 8 closely fits the periphery of the screw threads on the driven members 6 and 7 outside of the zone in which the screw threads intermesh, and in that zone the intermeshing screw threads form a complete closure between the axes of the driven members, (see Figs. 2 and 3). In operation, the driven members are rotated in opposite directions (see arrows in Fig. 2) and this rotation forces oil from the central space in the housing member 8 between the intermeshing pairs of screw threads to the opposite ends of the housing member 8 in a succession of pockets formed between the screw threads on each of the driven members 6 and 7, the housing member 8 and the intermeshing screw thread on the other driven member. Supply connection 11 to the central space in the housing and discharge connections 12 and 13 from opposite ends of the housing are provided for supply and discharge of oil to and from the pump.

Each of the driven members 6 and 7 is mounted upon a shaft, 14 and 15 respectively, carried in sets of bearings beyond the ends of the driven member. The sets of bearings on opposite ends of each shaft are alike. Each set of bearings for shaft 14 is made up of two parts; an inner bearing 16 and an outer bearing 17. The outer bearing 17 is carried by the adjacent end cover, 9 or 10, and the inner bearing is supported by a plate, 18 or 19, bolted between the face of the housing member 8 and the adjacent end cover. The outer bearing 17 is a bushing mounted in a socket 20 which is secured in the end cover, 9 or 10, and the outer end of which is closed. The inner bearing 16 is a bushing mounted in a collar 21 which is secured in the adjacent plate, 18 or 19. Each set of bearings for shaft 15 is also made up of two parts; an inner bearing 22 and an outer bearing 23. The inner bearing 22 is like the inner bearing 16, is a bushing mounted in a collar 24 which is secured in the adjacent end plate, 18 or 19. The outer bearing 23 is a bushing mounted in a socket 25 which is secured in the end cover, 9 or 10, and the outer end of which is fitted with a gland 26 to form a stuffing box.

Operating extensions of the shaft 15 project through the stuffing boxes, 27 and 28, in the respective end covers, 9 and 10. Either or both of these operating extensions is connected to some suitable driving means, such as an electric motor or a steam engine. The maintenance of a hydraulic balance with the pump is promoted by carrying both ends of the driving shaft through stuffing boxes, as illustrated, but this shaft may be driven from one end only. Shaft 14 is driven from shaft 15 by gears 29 and 30 arranged within the end cover 9. These gears are arranged to maintain the two driven members 6 and 7 in fixed relation and to effect rotation of the two driven members in opposite directions at equal speeds. A pair of gears similar to gears 29 and 30 may be provided at the other ends of the shafts 14 and 15.

The inner bearings 16 and 22 on the shafts 14 and 15 respectively are arranged to fit the shafts relatively loosely and the outer bearings 17 and 23 on the shafts 14 and 15 respectively are arranged to fit the shafts relatively closely. The plates 18 and 19 form compartments 31 and 32 within the end covers 9 and 10 respectively which by these plates are separated from the spaces in the ends of the housing member 8 communicating with the discharge connections 12 and 13. Connections 33 and 34 are provided for supplying to the compartments 31 and 32 respectively oil under pressure somewhat greater than that prevailing in the spaces in the ends of the housing member 8 on the other side of the plates 18 and 19. Apertures 35 are provided in the closed sockets 20 to establish communication between the space between the closed end of the socket and the ends of the shaft 14 and the compartments 31 and 32.

In operation, the shaft 15 is rotated (clockwise facing Fig. 2 or 3) forcing oil from the central space in the housing member 8 to the end spaces therein and cool oil is supplied through connections 33 and 34 under pressure somewhat exceeding that prevailing in the end spaces in the housing member 8 to establish a flow of oil inwardly through the inner relatively loosely fitting bearings 16 and 22 into the end spaces in the housing member 8 within the plates 9 and 10. This inward flow of cool oil assists in cooling and lubricating these bearings and in preventing escape of hot oil through the bearings from the inside of the pump chamber within the housing member 8 and between the plates 18 and 19, and also makes it possible to have the inner bearings 16 and 22 of loose enough fit to avoid sticking or binding over the wide range of temperatures to which such pumps are commonly subjected, say from ordinary atmospheric temperature up to 800° F. or more, without interference with satisfactory operation. The apertures 35 assist in lubricating the outer bearings 17.

The construction just described makes possible the use of particularly advantageous materials in the several parts of the pump. It is advantageous to machine the driven members 6 and 7 from iron castings, to use steel shafts and to make the plates 18 and 19 of sheet steel, and to make the housing member 8 and the end covers 9 and 10 of steel forgings. The driven members 6 and 7 are readily machined from cast iron. Maximum safety is provided by making the external elements of the housing of steel forgings. The various fittings attached to the housing member 8 and the end covers 9 and 10 may also with advantage be of forged steel.

The provision and arrangement of dual sets of bearings at each end of the shafts 14 and 15 carrying the driven members 6 and 7 is an important feature of the improved pump of the invention. The outer relatively closely fitting bearings 17 and 23 are rigidly supported in the end covers 9 and 10 and the inner relatively loosely fitting bearings 16 and 22 are supported with a substantial measure of flexibility in the plates 18 and 19. In operation, the outer closely fitting bearings are exposed only to the relatively low temperature of cool oil supplied to the compartments 31 and 32 while the inner bearings, exposed to the higher temperature of hot oil circulating through the pump chamber, fit relatively loosely and are further protected by cool oil forced through the bearings into the pump chamber from the compartments 31 and 32. This arrangement of the bearings makes the pump more dependable and also assists in maintaining high operating efficiency under severe operating conditions and particularly over wide ranges of temperature and at high temperature.

The improved pump of the invention is of special value and application in connection with pressure stills for cracking hydrocarbon oils of the general type described and illustrated in Letters Patent No. 1,285,200 granted to the Sinclair Refining Company, November 19, 1918, on an application of Edward W. Isom, and has further special advantages in connection with the modified pressure still of this general type illustrated in application Serial No. 197,035, filed June 7, 1927. This modified pressure still, and the oil heater embodied in it, are the invention, in so far as they are novel, of Harry L. Pelzer, a resident of Highland in the county of Lake and State of Indiana.

While the invention has been described in detail in connection with the particular pump illustrated in the drawings and its special utility in connection with one type of pressure still system pointed out, it will be understood that this detailed and specific description and showing of the invention is intended to illustrate and exemplify the invention and that the improved pump of the invention may be embodied in other forms and used to special advantage in connection with other cracking systems.

I claim:

1. An improved hot oil pump comprising a housing member forming a pump chamber, end covers therefor and plates arranged between the end covers and the housing member forming compartments within the end covers separate from the pump chamber within the housing member, a pair of shafts extending through the pump chamber and into the compartments in the end covers, said shafts being carried at their ends in dual sets of bearings, these sets of bearings comprising outer bearings supported by the end covers and inner bearings supported by the plates between the end covers and the housing member, one of said shafts having an operating extension projecting through one of the end covers, and a pair of coacting driven members arranged within the pump chamber and on said shafts and adapted by rotation, to force oil through the pump chamber.

2. An improved hot oil pump comprising a housing member forming a pump chamber, end covers therefor and plates arranged between the end covers and the housing member forming compartments within the end covers separate from the pump chamber within the housing member, a pair of shafts extending through the pump chamber and into the compartments in the end covers, said shafts being carried at their ends in dual sets of bearings, these sets of bearings comprising relatively closely fitting outer bearings supported by the end covers and relatively loosely fitting inner bearings supported by the plates between the end covers and the housing member, one of said shafts having an operating extension projecting through one of the end covers, and a pair of coacting driven members arranged within the pump chamber and on said shafts and adapted by rotation to force oil through the pump chamber.

3. An improved oil pump comprising a housing member forming a pump chamber, end covers therefor and plates arranged between the end covers and the housing member forming compartments within the end covers separate from the pump chamber within the housing member, a pair of shafts extending through the pump chamber and into the compartments in the end covers, said shafts being carried at their ends in dual sets of bearings, these sets of bearings comprising outer bearings supported by the end covers and inner bearings supported by the plates between the end covers and the housing member, one of said shafts having an operating extension projecting through one of the end covers, and a pair of coacting driven members arranged within the pump chamber and on said shafts and adapted by rotation to force oil through the pump chamber, said housing member being of forged steel and said driven members being of cast iron.

4. An improved hot oil pump comprising a housing member, end covers therefor and plates arranged between the end covers and the housing member forming compartments within the end covers separate from the chamber within the housing member, a pair of shafts extending through said chamber and into the compartments in the end covers, said shafts being carried at their ends in dual sets of bearings, these sets of bearings comprising outer bearings supported by the end covers and inner bearings supported by the plates between the end covers and the housing member, one of said shafts having an operating extension projecting through one of the end covers, and a pair of coacting driven members arranged within said chamber and on said shafts.

5. An improved hot oil pump comprising a housing member, end covers therefor and plates arranged between the end covers and the housing member forming compartments within the end covers separate from the chamber within the housing member, a pair of shafts extending through said chamber and into the compartments in the end covers, said shafts being carried at their ends in dual sets of bearings, these sets of bearings comprising relatively closely fitting outer bearings supported by the end covers and relatively loosely fitting inner bearings supported by the plates between the end covers and the housing member, one of said shafts having an operating extension projecting through one of the end covers and a pair of coacting driven members arranged within said chamber and on said shafts.

6. An improved oil pump comprising a housing member, end covers therefor and plates arranged between the end covers and the housing member forming compartments within the end covers separate from the chamber within the housing member, a pair of shafts extending through said chamber and into the compartments in the end covers, said shafts being carried at their ends in dual sets of bearings, these sets of bearings comprising outer bearings supported by the end covers and inner bearings supported by the plates between the end covers and the housing member, one of said shafts having an operating extension projecting through one of the end covers and a pair of coacting driven members arranged within said chamber and on said shafts, said housing member being of forged steel and said driven member being of cast iron.

In testimony whereof, I have subscribed my name.

THOMAS DE COLON TIFFT.